United States Patent
Demarez et al.

(10) Patent No.: US 7,346,031 B2
(45) Date of Patent: Mar. 18, 2008

(54) PAGING IN CELLULAR TELECOMMUNICATIONS SYSTEMS

(75) Inventors: Christophe Demarez, Tonquedec (FR); Theodore Lepouras, Swindon (GB); Silvia Martin-Leon, Swindon (GB); Dirk Suchantke, Heroldsberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 779 days.

(21) Appl. No.: 10/061,779

(22) Filed: Feb. 1, 2002

(65) Prior Publication Data

US 2002/0151307 A1   Oct. 17, 2002

(30) Foreign Application Priority Data

Feb. 6, 2001   (EP)   ................... 01301031

(51) Int. Cl.
  *H04Q 7/212*   (2006.01)
(52) U.S. Cl. ............... 370/331; 370/338; 370/349; 370/352; 455/433; 455/458; 455/560
(58) Field of Classification Search ............. 370/313, 370/329, 331, 332, 338, 349, 352, 389, 401, 370/402; 455/426.1, 433, 436, 458, 466, 455/560, 561
See application file for complete search history.

(56) References Cited

U.S. PATENT DOCUMENTS

| | | | |
|---|---|---|---|
| 6,292,667 B1 * | 9/2001 | Wallentin et al. | 455/458 |
| 6,389,008 B1 * | 5/2002 | Lupien et al. | 370/352 |
| 6,469,992 B1 * | 10/2002 | Schieder | 370/329 |
| 6,477,382 B1 * | 11/2002 | Mansfield et al. | 455/458 |
| 6,542,497 B1 * | 4/2003 | Curry et al. | 370/352 |
| 6,606,501 B1 * | 8/2003 | Saha et al. | 455/456.1 |
| 6,636,502 B1 * | 10/2003 | Lager et al. | 370/352 |
| 2001/0012279 A1 * | 8/2001 | Haumont et al. | 370/331 |

FOREIGN PATENT DOCUMENTS

WO   WO 99/57935   11/1999
WO   WO 00/05907   2/2000

OTHER PUBLICATIONS

XP002133982, Digital Cellular Telecommunications System, ETSI, Aug. 1999.

* cited by examiner

*Primary Examiner*—Chi Pham
*Assistant Examiner*—Shick Hom

(57) ABSTRACT

A mobile station is located and paged for a circuit-switched connection in a GSM system which supports data packet switching (GPRS) services. A table held by the SGSN is provided for locating a mobile station where the mobile has moved from the Routing Area in which it was last located to a cell within the same Location Area which does not support GPRS services. The GSM system comprises a plurality of base station controllers (BSS) serving cells in a Location Area (LA), a circuit-switch control (MSC/VLR) for establishing circuit-switched connections to mobile stations within the Location Area, and a packet control (SGSN) for establishing data packet-switching with mobile stations within one or more Routing Areas (RA) within the Location Area. The packet control, in response to a paging request, consults information from a table held by the packet control of base station controllers which serve cells in the Location Area which are not part of a Routing Area, and instructs base station controllers to page cells in the Location Area and in particular the cells not forming part of a Routing Area.

17 Claims, 3 Drawing Sheets

PAGING IN CELLULAR TELECOMMUNICATIONS SYSTEMS

CROSS REFERENCE TO RELATED APPLICATION

This application claims priority of European Application No. 01301031.9 filed on Feb. 6, 2001.

FIELD OF THE INVENTION

The present invention relates to paging in cellular telecommunications systems. Whilst the invention has general application to all types of system, the invention has particular application to the GSM system.

DEFINITIONS

In this specification, the following abbreviations and terminology are used:

| | |
|---|---|
| BS | Base Station |
| BSC | Base Switching Centre |
| BSS | Base Station Sub System |
| BTS | Base Transmitter Station |
| CS | Circuit Switched |
| GPRS | General Packet Radio System |
| LA | Location Area |
| LAC | Location Area Code |
| MS | Mobile Station |
| MSC | Mobile Switching Centre |
| PCH | Paging Channel |
| RA | Routing Area |
| RAC | Routing Area Code |
| SGSN | Serving GPRS Support Node |
| VLR | Visitor Location Register |

BACKGROUND OF THE RELATED ART

In GSM, as shown in FIG. 1, a mobile switching centre MSC with associated VLR controls a plurality of Base Station Subsystems BSS 1-4 through the A interface. Each BSS controls a plurality of base stations BSNa-BSNn, each BS having an associated cell, in which may be located a number of mobile stations (not shown). The totality of cells served by the MSC is partitioned into several Location Areas LA1 LA2, etc. Each LA is served by the BSS responsible for the cells in the LA, but the cells belonging to an LA are not necessarily coincident with the cells belonging to a BSS, see, for example, LA1 which is served by BSS1-4.

In mobility management, the location of an MS is updated in the VLR when it moves from one LA to another. The VLR maintains the information for each MS in a group of LAs.

In GSM networks services, such as speech, are provided on a CS basis in which a channel or timeslot is exclusively allocated to that service. In order to set up a call from the network to a mobile station MS, a call termination procedure is carried out in which the VLR is firstly consulted as to the position of the MS, and the MS is then paged. Paging is performed by paging commands from the MSC to the BSS via the A interface, and via the radio interface over a paging channel (PCH) from the BSS to the MS. Paging through the A interface is defined, for example, in GSM 08.08., see FIG. 15 of GSM 08.08 and sections 3.1.10 and 3.2.1.19. of GSM 08.08. The CS paging request for an MS in STANDBY mode is addressed to a Location Area (LA), in which the MS was last recorded, and is distributed by the BSS in all cells belonging to this Location Area. Each LA is assigned a unique Location Area Code (LAC) by the operator and subsequently each cell within a LA is configured to have the same LAC.

The GSM system also supports data packet-switching through GPRS, for example, Internet applications. The GSM circuit-switching architecture cannot satisfy the packet-switching nature of GPRS, and GPRS requires its own transport network as shown in FIG. 2. GPRS has two control entities, firstly a support GPRS node (SGSN) and secondly, a gateway GPRS support node (GGSN) which interworks with exterior networks. The SGSN has various G interfaces with the other control entities. In particular, it has a Gs interface with the MSC/VLR, and a Gb interface with the BSS.

In GPRS networks the CS paging procedure outlined above applies in Network Operation Mode (NOM) II and III for an MS in GPRS STANDBY mode. However, in NOM I, the CS paging request has to be sent from the VLR to the SGSN through the Gs interface by a BSSAP+_PAGING_REQUEST message. Subsequently, the SGSN sends a CS paging request, comprising a PAGING_CS PDU to the BSS through the Gb interface. In this case, the CS paging request is addressed to a Routing Area (RA), which is a subset of one, and only one, LA. There may be any number, between 1 and a large number, of Routing Areas within a Location Area LA.

Only cells supporting GPRS services are configured within a RA. In a similar fashion to the LA configuration, a RA is assigned a unique Routing Area Code (RAC) by the operator and subsequently each cell within a RA is configured to have the same RAC. Cells that do not support GPRS services (non-GPRS cells) are configured only on a LA basis, while those supporting GPRS services (GPRS cells) are configured on both a LA and a RA basis. It is up to the operator to specify the number of RAs within a LA. The SGSN maintains all RA information.

In case an MS moves from a cell within a RA into a cell that belongs to another Routing Area, it will perform a Routing Area Update procedure towards the SGSN, hence the SGSN will get informed of the MS's new location, and modify the paging request accordingly. If the new RA belongs to a different LA, the MS will also perform a Location Update procedure towards the VLR, via the SGSN. Should the MS move from a GPRS cell into a non-GPRS cell that belongs to a different LA, it will perform a Location Update procedure towards the VLR, through the A-interface. However, in case the MS moves from a GPRS cell into a non-GPRS cell within the same LA, it will not initiate a Location Update procedure, hence the network (VLR/SGSN) will have no knowledge of the MS's new location. In this case, should the VLR send a CS paging request to this MS through the SGSN, the SGSN will forward the paging request to the BSS indicating paging in the last reported RA in which the MS was located. Since the MS has moved to a non-GPRS cell, it will not receive the CS paging request from the BSS. To cater for such a case, the GSM Standards specify that all non-GPRS cells within a LA are grouped by the SGSN into a 'null RA'. Regarding the CS paging procedure at the SGSN, section 5.3 in GSM 09.18 specifies that "if within a Location Area there are cells that do not support GPRS services, the SGSN will group these cells under a 'null RA'. The SGSN will perform the paging procedure described above within both the RA(s) derived from the location information and the 'null RA(s)' of the corresponding Location Area(s)". Apart from this statement the Standards have no other references on the null RA issue.

The Standards do not specify a procedure to be used by the SGSN in order to indicate to the BSS 'paging in the null RA'. Further, it is not clear in the Standards whether the BSS should page GPRS cells only, or both GPRS and non-GPRS cells within a LA, when it receives a CS paging request from the SGSN indicating paging in the LA.

SUMMARY OF THE INVENTION

It is an object of the invention to overcome or at least reduce the above problems.

The present invention is based on the realisation that only the BSS have knowledge of all cells served by the BSS, the SGSN only having knowledge of those BSS which serve RAs, from the initial configuration operation. In order for the SGSN to page all possible cells within an associated LA which includes the RA in which the MS was last recorded, the present invention provides a method and means for the SGSN to obtain information about non-GPRS cells within the said LA. This therefore ensures that when the SGSN issues a paging request it can send a paging request to all BSS serving the Location Area in which the current RA is located, which have non-GPRS cells, so that all relevant non-GPRS cells are paged.

In a preferred form, the invention provides a table or other record, maintained by the SGSN which lists BSS, and the LAs they serve, which have non-GPRS cells in them. In an alternative form, a central table may be maintained for the network, which all SGSN of the network may access.

There are two modes of paging operation in accordance with the invention, when an SGSN is operative in the GPRS mode, and it receives a CS paging request. In a first mode of operation, it issues a paging command to all those BSS serving the LA in which the current RA is located, so that the BSS page all cells within the LA. Whilst this has an advantage of simplicity, it has the disadvantage of paging more cells than is absolutely necessary.

In a second mode of operation, the SGSN issues a paging request, with the RA identity attached, to those BSS serving the current RA, so that these BSS can page the RA cells, and also non-GPRS cells (which do not recognise the RA identifier) within the LA area of the RA cell. In addition, the SGSN obtains information, as indicated above, as to any other BSS serving the LA, which have non-GPRS cells. These other BSS are instructed to issue paging requests. By attaching the RA identifier to the command, these other BSS will, since they will not recognise the RA identifier, page only non-GPRS cells.

Further in accordance with the invention, the operator may decide to implement a flag or other switching device per SGSN (configurable by the operator), in order to allow the operator to decide whether the CS paging will be done on a RA or a LA basis. This flag will allow the operator to implement CS paging on a LA basis or on a RA basis for SGSNs interworking with BSSs, that will handle the null RA paging as specified. The flag provides for future optimisation in an operator's network when a Standardised solution is available for the null RA paging.

Thus, in accordance with one aspect of the invention, to solve the null RA issue, the SGSN sends a CS paging request to the BSS indicating paging in the LA, rather than in the RA, as it happens in GSM networks when the CS paging request is sent from the VLR to the BSS through the A-interface.

Upon receipt of a CS paging request indicating paging in a LA, the BSS will page all GPRS and non-GPRS cells within the LA, hence the null RA paging would be covered in this case.

However, since the RA concept was introduced to reduce the overhead caused by paging requests within a GPRS network (GPRS networks are expected to generate and handle a fairly bigger amount of paging requests comparing to existing GSM networks), it is desirable to provide an additional means of paging all cells, in accordance with a further aspect of the invention, as follows.

The SGSN has knowledge of the Routing Areas/Location Areas each BSS serves due to the cell status information received at the SGSN from each BSS, during the SGSN-BSS initial configuration. However, since the cell status information is associated only with GPRS cells, the SGSN has no knowledge of any non-GPRS cells supported within a Location Area. Therefore, if a LA spans several BSSs served by the same SGSN, the SGSN has knowledge only of those BSSs that serve GPRS cells belonging to the LA. Hence, in case a BSS serves only non-GPRS cells within a LA, the SGSN will have no information stored in its database about those non-GPRS cells and subsequently no information that the particular BSS serves the LA. In order to overcome this issue, the SGSN obtains information, of the Location Areas that serve non-GPRS cells per BSS, for all BSSs served by the SGSN. This information will be provided by the operator. Each time the SGSN sends a CS paging request to the BSS indicating paging in a RA or a LA, the SGSN will obtain this information to identify the BSSs that serve non-GPRS cells belonging to the Location Area specified in the LAC.

Thus, in accordance with the invention, the SGSN will initiate the following procedures:

In case of CS paging in the LA, the SGSN will send a CS paging request with an LAI IE to all BSSs that serve GPRS, non-GPRS and blocked GPRS cells belonging to the indicated LA. Upon receipt of the CS paging request each BSS will page all cells within that LA including the 'blocked' GPRS cells (if possible) and the non-GPRS cells.

In case of CS paging in the RA, the SGSN will send the following paging requests:

CS paging request with a RAC that identifies the last reported RA to the BSS(s) that serves the RA indicated. The BSS(s) will page the GPRS cells within the indicated RA and all the non-GPRS cells served by the LA that the RA belongs to (including the 'blocked' GPRS cells—if possible—served by the LA that the RA belongs to).

CS paging request to all other BSSs which serve non-GPRS cells (including the 'blocked' GPRS cells) within the LA that the RA indicated in the RAC belongs to, but do not serve the RA itself. Those BSSs that receive the CS paging request from the SGSN have no knowledge of the RA specified in the RAC, they only know the LA specified in the LAC. If a BSS receives a paging request with an unknown RAC and a known LAC, it will page only the non-GPRS cells served by the LA indicated (including the 'blocked' GPRS cells—if possible—served by the LA indicated).

The first procedure is a simple solution that i) brings to an end the ambiguity in the Standards on whether the BSS pages only GPRS cells within a Location Area, upon receipt of an LAI IE in the CS paging request from the SGSN and ii) provides an alternative to the operators who require a solution for the null RA paging but prefer their BSSs/SGSNs to perform CS paging in the LA.

In the second procedure of CS paging in RA, the SGSN needs to send only one CS paging request to the BSS that serve the RA indicated in the RAC; no additional CS paging request is sent to those BSS to provide for paging in the null RA. It is up to the BSS to identify and page also the non-GPRS cells and blocked GPRS cells served but the LA that the RA belongs to.

Accordingly, the present invention relates to a cellular telecommunications system comprising:

a plurality of base station control means (BSS) serving cells in a Location Area (LA), which comprises a first plurality of cells, circuit-switch control means (MSC/VLR) for said Location Area, for establishing circuit-switched connections thereto, packet control means (SGSN) for establishing data packet-switching with mobile stations within one or more Routing Areas (RA), the or each Routing Area comprising a second plurality of cells, being a subset of the first plurality of cells, and the packet control means (SGSN) being operative to page mobile stations within a Routing Area for initiating a circuit-switched connection to a mobile station.

In a first aspect, the invention provides such a system, wherein the packet control means has means to provide information of base station control means which serve cells within the Location Area which are not part of a Routing Area, and in that the packet control means consults said information when paging mobile stations.

In a second aspect, the invention provides apparatus in such a system, wherein the packet control means has means to provide information of those base station control means which serve cells within the Location Area which are not part of a Routing Area, and in that the packet control means is operative to consult said information when paging mobile stations. In a third aspect, the invention provides a method of paging in such a system, the method comprising:

said packet control means, in response to a paging request, obtaining information of base station control means which serve cells in said Location Area which are not part of a Routing Area, and said packet control means instructing base station control means to page selected cells in said Location Area and in particular said cells which are not part of a Routing Area.

BRIEF DESCRIPTION OF THE DRAWINGS

Preferred embodiments of the invention will now be described with reference to the accompanying drawings, wherein.

DETAILED DESCRIPTION

Figure 1:
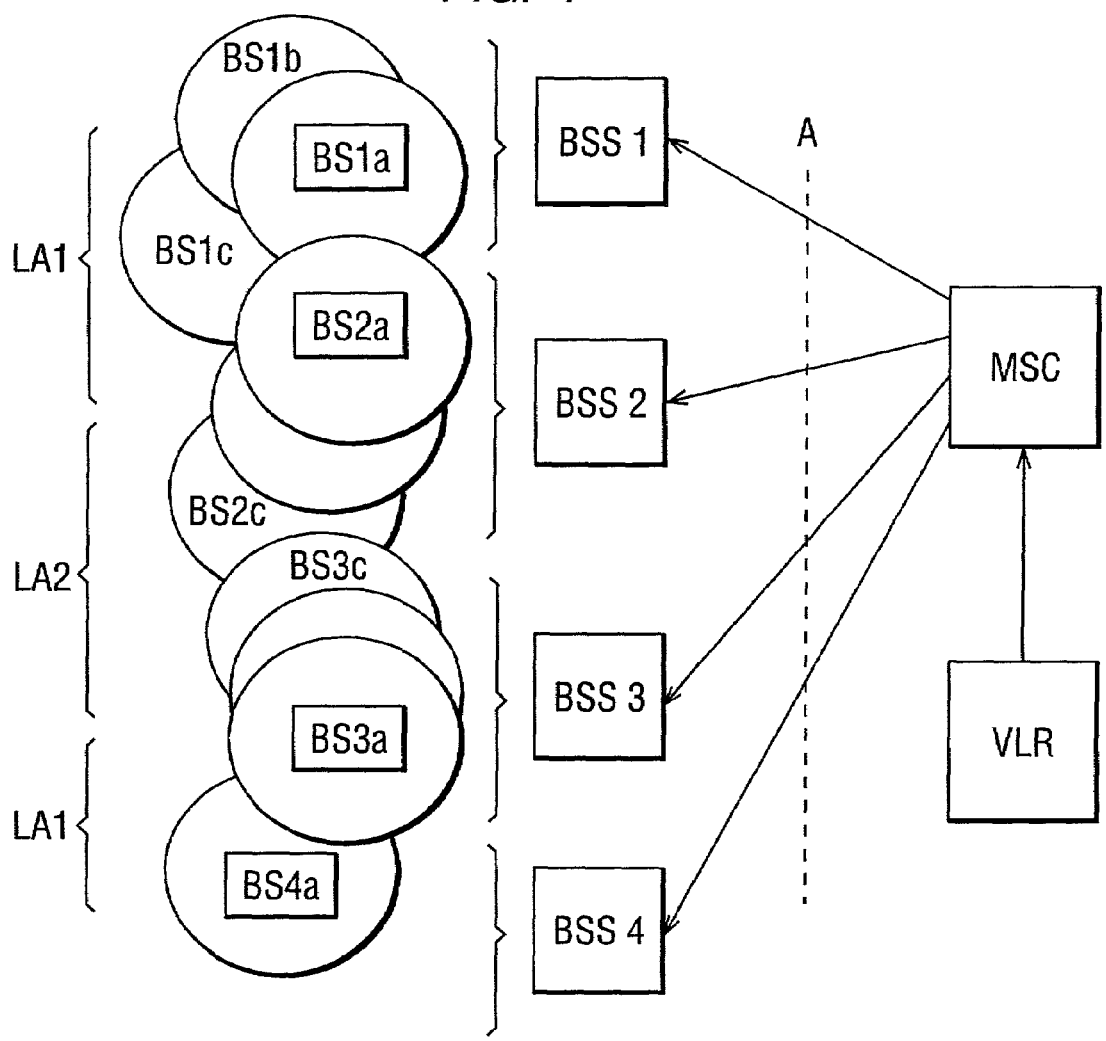
FIG. 1 is a conceptual diagram of a GSM architecture showing Location Areas.
Figure 3:
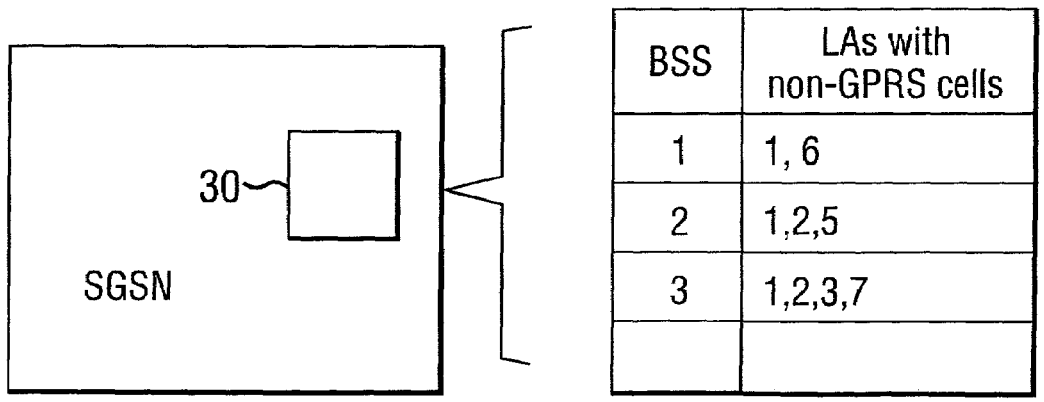
FIG. 3 is a schematic diagram of an SGSN incorporating a table for locating non-GPRS cells, according to an embodiment of the invention.
Figure 2:
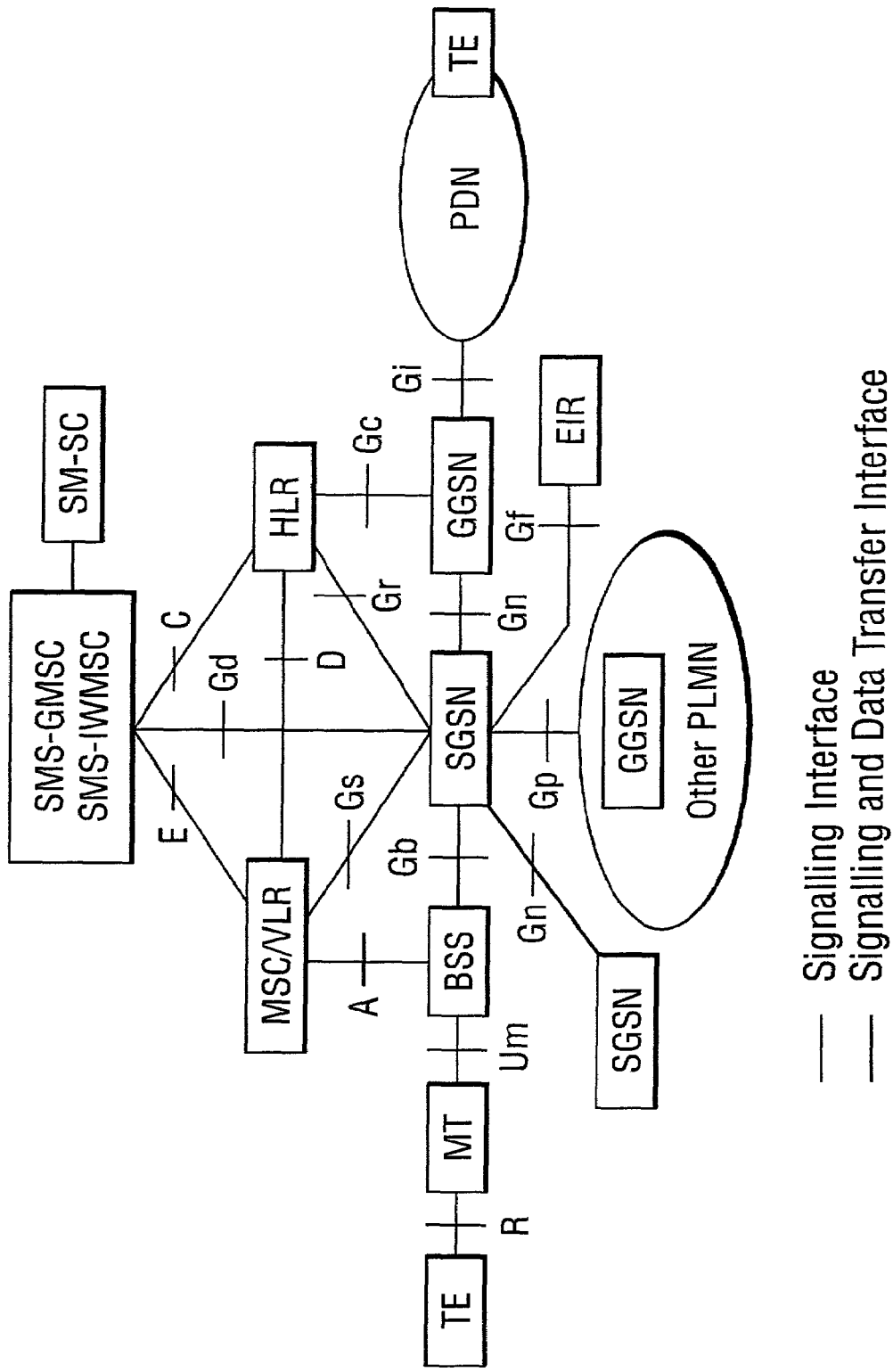
FIG. 2 is a conceptual diagram of the GPRS logical architecture, as specified in the GSM standards.

Referring now to the embodiment shown in FIG. 3 an SGSN is shown including a table 30 stored in memory and shown in more detail on the right hand side of FIG. 3. As shown, the table has two columns, firstly a list of BSS coupled to the SGSN, and secondly, a column identifying Location Areas for each BSS which have non-GPRS cells. Thus in operation, when the SGSN receives a paging request from the network, it issues a paging command to the BSS coupled to the SGSN through the Gb interface. In addition, it ensures in the paging request that, by accessing the table, all BSS having non-GPRS cells will be instructed to page those cells. The precise manner in which this is effected will now be described with reference to FIG. 4.

Figure 4:
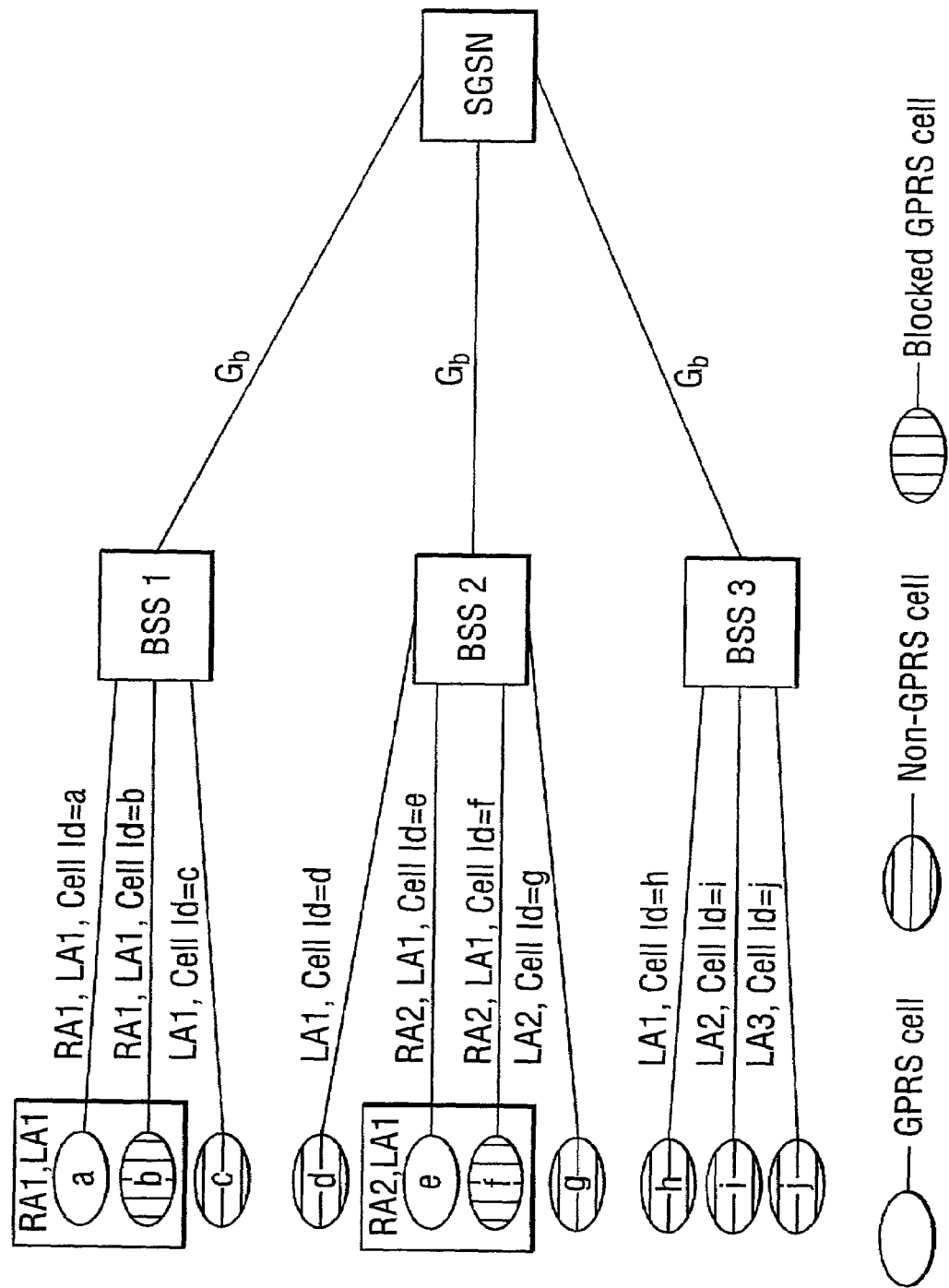
FIG. 4 is a conceptual view an arrangement of cells, some of which are GPRS cells and some of which are not, and an arrangement in accordance with the invention for issuing paging requests to the cells.

Referring to FIG. 4, there are two separate modes of operation. In the case of CS paging in the LA, the SGSN will send a CS paging request with an LAI IE to all BSSs that serve GPRS, non-GPRS or blocked GPRS cells belonging to the indicated LA. Upon receipt of the CS paging request each BSS will page all cells within that LA including the 'blocked' GPRS cells (if possible) and the non-GPRS cells.

As an example, the SGSN has to send a CS paging request to all BSSs that serve LA1. The SGSN already knows from the cell status information received from BSS1 and BSS2 during the SGSN-BSS1 and SGSN-BSS2 initial configurations that there are GPRS cells in BSS1 and BSS2 which belong to LA1 (cells a, b in BSS1 and cells e, f in BSS2—cells b and f are currently blocked). The SGSN also identifies from the cell status information it holds that BSS1 and BSS2 serve blocked GPRS cells belonging to LA1. Therefore, the SGSN will send a CS paging request to BSS1 and BSS2 with the LAC indicating LA1. Upon receipt of the CS paging request BSS1 will page cells a, b (if possible) and c, while BSS2 will page cells d, e and f (if possible). However, the SGSN has no knowledge that cell h also belongs to LA1 since it is a non-GPRS cell and therefore no cell status information about it was sent from BSS3 to the SGSN during the SGSN-BSS3 initial configuration. The only way for the SGSN to get information about this cell is through the table of the Location Areas that serve non-GPRS cells per BSS, provided by the operator.

The SGSN identifies from the table that BSS1, BSS2 and BSS3 serve non-GPRS cells that belong to LA1. Hence, the SGSN will also send a CS paging request to BSS3 that will page in turn cell h.

In the case of CS paging in the RA, the SGSN will send the following paging requests:

CS paging request with a RAC that identifies the last reported RA to the BSS(s) that serves the RA indicated. The BSS(s) will page the GPRS cells within the indicated RA and all the non-GPRS cells served by the LA that the RA belongs to (including the 'blocked' GPRS cells—if possible—served by the LA that the RA belongs to).

As an example, the SGSN identifies from the cell status information it holds that RA1 is served by BSS1 and subsequently sends a CS paging request to BSS1 with the RAC, LAC of the RAI IE indicating RA1 and LA1 respectively. BSS1 will page the GPRS cell a within RA1 and also page the non-GPRS cell c and the blocked GPRS cell b (if possible) since they are both served by LA1 that RA1 belongs to. In that way, the SGSN will send only one CS paging request to BSS1, it is up to BSS1 to identify and page also the non-GPRS cells (including the blocked GPRS cells) served by LA1 that the RA1 belongs to.

Note: In the illustration, RA1 within LA1 is served only by BSS1. However, a RA can span more than one BSSs. In such a case, the mechanism specified in step 1 will be implemented for all BSSs that serve the RA.

CS paging request to all other BSSs which serve non-GPRS cells (including the 'blocked' GPRS cells) within the LA that the RA indicated in the RAC belongs to, but do not serve the RA itself. Those BSSs that receive the CS paging request from the SGSN have no knowledge of the RA specified in the RAC, they only know the LA specified in the LAC. If a BSS receives a paging request with an unknown RAC and a known LAC, it will page only the non-GPRS cells served by the LA indicated (including the 'blocked' GPRS cells—if possible—served by the LA indicated).

The SGSN will look up in the table with the Location Areas that serve non-GPRS cells per BSS, to identify the BSSs that serve LA1.

In addition, the SGSN shall check its database with the cell status information to identify the BSSs that serve blocked GPRS cells belonging to LA1. The SGSN identifies from the table that BSS1, BSS2 and BSS3 serve non-GPRS cells that belong to LA1. The SGSN also identifies from the cell status information it holds that BSS1 and BSS2 serve blocked GPRS cells belonging to LA1. In this case, the SGSN will also send a CS paging request to BSS2 and BSS3 with the RAC, LAC indicating RA1 and LA1 respectively. BSS2 and BSS3 have no knowledge of the RA1 that belongs to LA1 (since BSS1 is uniquely associated with the specific RA), but they do know LA1 since they serve cells belonging to this LA. Therefore, BSS2 and BSS3 will page only the non-GPRS cells that belong to LA1 (cell d in BSS2 and cell h in BSS3, including the blocked GPRS cell f in BSS2).

The invention claimed is:

1. A cellular telecommunications system comprising:
    a plurality of base station control means (BSS) serving cells in a Location Area (LA), which comprises a first plurality of cells,
    circuit-switch control means (MSG/VLR) for said Location Area, for establishing circuit-switched connections to mobile stations within the Location Area,
    a serving GPRS support node (SGSN) which provides packet control means for establishing data packet-switching with mobile stations within one or more Routing Areas (RA), each Routing Area comprising a second plurality of cells, being a subset of the first plurality of cells, and the SGSN being operative to page mobile stations within a Routing Area for initiating a circuit-switched connection to a mobile station,
    characterised in that the SGSN comprises a record to provide information as to which base station control means serve cells within the Location Area which are not part of a Routing Area, and in that the SGSN consults said information when paging mobile stations.

2. The system according to claim 1, wherein the SGSN is arranged to issue a paging request to said base station control means that cells within said Location Area should be paged.

3. The system according to claim 2, wherein the SGSN is arranged to issue a paging request including a Location Area Information Identifying Element, so that cells falling within other Location Areas are not paged.

4. The system according to claim 1, wherein the SGSN is arranged to issue a paging request to said plurality of base station control means indicating that said second plurality of cells should be paged corresponding to the Routing Area in which the mobile station was last located, and in addition, said cells which are not part of a Routing Area.

5. The system according to claim 4, wherein the SGSN is arranged to issue the paging request including a Location Area Information Identifying Element and a Routing Area Information Identifying Element, so that cells falling within other Routing Areas are not paged.

6. The system according to claim 1 for selecting a paging request.

7. The system according to claim 1, wherein the record of the SGSN includes a table means which lists base station control means, and the Location Area or Areas served by such base station control means which include cells not forming part of a Routing Area.

8. The system according to any preceding claim, wherein the SGSN is arranged to page cells which are part of a Routing Area but are blocked from data-packet switching operation, said packet control means being arranged to obtain information on blocked cells from a database of cell status information included in said packet control means.

9. A method of paging in a cellular telecommunications system, the system comprising:
    a plurality of base station control means (BSS) sewing cells in a Location Area (LA), which comprises a first plurality of cells,
    circuit-switch control means (MSC/VLR) for said Location Area, for establishing circuit-switched connections to mobile stations therein,
    a serving GPRS support node (SGSN) which provides packet control means for establishing data packet-switching with mobile stations within one or more Routing Areas (RA), each Routing Area comprising a second plurality of cells, being a subset of the first plurality of cells,
    said paging method being characterised by:
    the SGSN paging mobile stations within a Routing Area for initiating a circuit-switched connection to a mobile station,
    the SGSN comprising a record and, in response to a paging request, obtaining information from its record as to which base station control means serve cells in said Location Area which are not part of a Routing Area, and
    the SGSN instructing base station control means to page selected cells in said Location Area, including cells which are not part of a Routing Area.

10. The method according to claim 9, wherein the SGSN issues a paging request to said plurality of base station control means that all cells within said Location Area should be paged.

11. The method according to claim 10, wherein said paging request includes a Location Area Information Identifying Element, so that cells falling within other Location Areas are not paged.

12. The method according to claim 9, wherein the SGSN issues a paging request to said plurality of base station control means indicating that cells in a specific Routing Area should be paged and in addition, said cells not forming part of a Routing Area.

13. The method according to claim 12, wherein said paging request includes a Location Area Information Identifying Element and a Routing Area Information Identifying Element, so that cells falling within other Routing Areas are not paged.

14. The method according to claim 9 including preselecting whether a paging request.

15. The method according to claim 9, wherein the record of the SGSN includes a table means which lists base station control means, and the Location Area or Areas served by each base station control means which include cells not forming part of a Routing Area.

16. The method according to claim 9, the SGSN instructing said base station control means to page cells in a Routing Area which are blocked for operation ror data-packet switching.

17. The method according to claim 16, the SGSN obtaining information of blocked cells from a database of cell status information held by the packet control means.

* * * * *